Jan. 19, 1932.  E. SØLVER  1,841,764
GUDGEON PIN ESPECIALLY FOR TRUNK PISTONS IN INTERNAL COMBUSTION ENGINES
Filed March 28, 1929
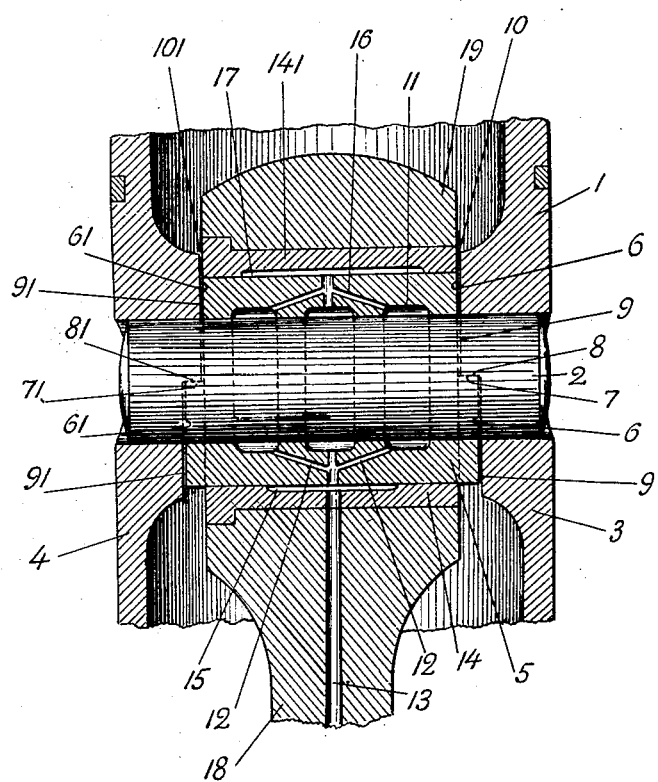
E. Sølver
INVENTOR
BY: Marks & Clerk
Attys.

UNITED STATES PATENT OFFICE

EINAR SØLVER, OF HELLERUP, NEAR COPENHAGEN, DENMARK

GUDGEON PIN ESPECIALLY FOR TRUNK PISTONS IN INTERNAL COMBUSTION ENGINES

Application filed March 28, 1929, Serial No. 350,689, and in Denmark May 1, 1928.

This invention relates to improvements in gudgeon pins especially for trunk pistons in internal combustion engines and the invention is chiefly characterized by a sleeve placed on the gudgeon pin and consisting of one or more pieces, which sleeve with a cylindrical outer surface or surfaces having an essentially greater diameter than those parts of the gudgeon pin enclosed by the gudgeon pin bosses of the piston forms the direct bearing surface for the small end of the connecting rod, the sleeve or the like being so arranged that it is prevented from rotating relatively to the piston. In trunk pistons for internal combustion engines, working at high compression and combustion pressures, no difficulty is generally found in providing space for a cylindrical gudgeon pin of uniform diameter and of sufficient strength to stand the bending stresses arising from the working pressures. However, it is often found difficult to provide space for a normal gudgeon pin and with a diameter great enough to keep down the bearing pressure sufficiently to ensure that the film of lubricating medium, which must be present between the connecting rod brass and the gudgeon pin, remains unbroken. The dimensions of the gudgeon pin are limited especially by the fact that large holes in the pin bosses of the piston are liable to cause too great a weakening of the piston wall. Furthermore if the holes in the piston become too large, there will not be space enough for a sufficient reinforcement of the piston wall around the holes and bosses. The ordinary cylindrical gudgeon pins have the further disadvantage that the piston pin expands when heated by friction during the running of the engine, so that the piston is deformed. The invention aims at remedying the above mentioned drawbacks peculiar to the known gudgeon pins of uniform diameter, and the invention is as stated chiefly characterized by the fact that on the gudgeon pin, the diameter of which corresponds to the actual holes in the piston, is placed a sleeve or muff cylindrical on its outside and with a diameter corresponding to the desired size of the bearing in the small end of the connecting rod. The sleeve may either consist of a continuous ring-shaped part pushed over the pin and fastened to the pin or to the piston in such a way that the sleeve cannot rotate relatively to the piston, or the sleeve may consist of separate parts which are fastened around the gudgeon pin. To prevent the sleeve from rotating relatively to the piston there may be formed on the end surfaces of the sleeve convenient projections, guiding surfaces, recesses or the like meshing with corresponding parts in the piston bosses. A gudgeon pin with detachable sleeve may without difficulty be placed in a trunk piston of the ordinary type. In order to allow a certain expansion due to heat of the sleeve placed on the gudgeon pin, the sleeve and the piston are so dimensioned that there is a small clearance between the inner plane surfaces of the pin bosses and the end surfaces of the sleeve. To ensure that the least possible frictional heat of the sleeve may be conducted to the pin, the bore of the sleeve is shaped so that cavities or deepenings are formed which act as heat insulators, the sleeve touching e. g. only the pin with separate cams or annular bearing surfaces, while the remaining parts of the bore are recessed or sunk. The said cavities may also be used as cooling chambers, through which may flow a circulating cooling liquid. One or more of the said cavities or of special cavities formed in the interior of the sleeve may also form part of the pressure lubrication system, so that the cavities are traversed by the lubrication oil, the cavities being in communication with the supply passage of the pressure lubricating system and with the bearing surfaces between the sleeve and the brasses in the small end of the connecting rod. The drawing shows a constructional form of the invention in a longitudinal section through the gudgeon pin and portions of the piston and the connecting rod of a piston construction designed according to the invention. 1 denotes the piston which in the ordinary way encloses the small end 19 of the connecting rod 18. These parts are connected with each other by a gudgeon pin 2, on to which is pushed a tubular sleeve 5 of greater diameter than the gudgeon pin. The ends of the gudgeon pin 2 are located in corresponding bores in the pin bosses 3 and 4. The sleeve 5 fits closely around the gudgeon pin 2, and the end surfaces 6 and 61 of the sleeves are stepped, so that therein, or near a horizontal plane through the axis of the pin, are formed flats 7 and 71 which bear on the corresponding flats 8 and 81 on the pin bosses 3 and 4. The inward facing flat surfaces 9 and 91 of the pin bosses are stepped in the same way as the end surfaces of the sleeve. The length of the sleeve is slightly smaller than the distance between the flat surfaces 9 and 91 of the pin bosses, so that a suitable clearance space 10 and 101 is produced, which allows for the necessary expansion of the sleeve due to heat. The stepping of the end surfaces of the sleeve ensures that the sleeve 5 does not take part in the swinging motion of the connecting rod while the free expansion due to heat is not impeded. In the bore of the sleeve 5 are a number of ring grooves 11 which through a system of passages 12 communicate with the supply passage 13 of the pressure lubricating system in the connecting rod 18. The supply passage 13 is carried through the lower brass 14 of the connecting rod bushing and ends in the lubrication passages 15 which serve to distribute the lubricating oil over the bearing surfaces of the sleeve 5 and the lower brass 14, the lubrication of the latter being thus secured. To lubricate the upper brass a system of passages 16 starting from the annular grooves 11 is provided, through which passages the oil is again collected in order to flow from there out into the oil groove 17 in the upper brass 141 of the small end of the connecting rod, from which bearing the oil returns to the oil tank. The surface pressure on the outside of the sleeve is very small owing to the great external diameter of the sleeve, which thus is not exposed to any particularly great heating. The sleeve does not fit tighter around the pin 2 than will allow for the expansion due to heat and the sleeve 5 itself is cooled by the oil flowing through the passages 12 and 16 and the annular oil grooves 11. As already stated it is not necessary to use all of the annular grooves 11 as part of the lubricating system, as one or more of them may be kept filled with air to serve as heat insulation between the sleeve and the gudgeon pin. It is possible also to use the recesses 11 as circulation spaces for other cooling liquids than the lubricant. In the shown form of construction the enlargement of the middle part of the gudgeon pin consists of a tubular sleeve 5 pushed over the pin, which by any suitable means is prevented from rotating relatively to the gudegon pin or the piston. The sleeve 5 may, however, also consist of assembled parts, e. g. of two semi-cylindrical parts. The invention may be varied in other ways than shown and specified without departing from its principle.

I claim:

1. In combination, a piston having pin bosses, a gudgeon pin in said bosses, a sleeve mounted on said pin having at least one cylindrical outer surface of considerably greater diameter than the parts of the gudgeon pin engaging the piston bosses, said cylindrical outer surface forming a direct bearing surface for the small end of a piston connecting rod, and cavities formed on the surface of the sleeve engaging said pin constituting heat insulating means, and means on the end surfaces of the sleeve and the pin bosses to prevent the sleeve from rotating relatively to the piston.

2. In combination, a piston having pin bosses to prevent the sleeve from rotating mounted on said pin having at least one cylindrical outer surface of considerably greater diameter than the parts of the gudgeon pin engaging the piston bosses, said cylindrical outer surface forming a direct bearing surface for the small end of a piston connecting rod, and cavities formed on the surface of the sleeve engaging said pin constituting heat insulating means, and interengaging projections on the pin bosses and on the sleeve to prevent the sleeve from rotating relatively to the piston.

3. In combination, a piston having pin bosses, a gudgeon pin in said bosses, a sleeve mounted on said pin having at least one cylindrical outer surface of considerably greater diameter than the parts of the gudgeon pin engaging the piston bosses, said cylindrical outer surface forming a direct bearing surface for the small end of a piston connecting rod, and cavities formed on the surface of the sleeve engaging said pin constituting heat insulating means, the areas on the sleeve engaging the pin being formed by separate annular bearing surfaces, and interengaging projections on the pin bosses and on the sleeve to prevent the sleeve from rotating relatively to the piston.

4. In combination, a piston having pin bosses, a gudgeon pin in said bosses, a sleeve mounted on said pin having at least one cylindrical outer surface of considerably greater diameter than the parts of the gudgeon pin engaging the piston bosses, said cylindrical outer surface forming a direct bearing surface for the small end of a piston connecting rod, and cavities on the interior of the sleeve and means for establishing communication between said cavities and a pressure lubricating system, and interengaging projections on the pin bosses and on the sleeve to prevent the sleeve from rotating relatively to the piston.

5. In combination, a piston having pin bosses, a gudgeon pin in said bosses, a sleeve mounted on said pin having at least one cylindrical outer surface of considerably greater diameter than the parts of the gudgeon pin engaging the piston bosses, said cylindrical outer surface forming a direct bearing surface for the small end of a piston connecting rod, and cavities formed on the surface of the sleeve engaging said pin constituting heat insulating means, the areas on the sleeve engaging the pin being formed by separate annular bearing surfaces; means for establishing communication between said cavities and a pressure lubricating system, and interengaging projections on the pin bosses and on the sleeve to prevent the sleeve from rotating relatively to the piston.

6. In combination, a piston having pin bosses, a gudgeon pin in said bosses, a sleeve mounted on said pin having at least one cylindrical outer surface of considerably greater diameter than the parts of the gudgeon pin engaging the piston bosses, said cylindrical outer surface forming a direct bearing for the small end of a connecting rod, and facially abutting projections on the pin bosses and sleeve preventing rotary movement of the latter.

In testimony whereof I affix my signature.

EINAR SØLVER.